(12) United States Patent
Sengupta et al.

(10) Patent No.: US 9,665,155 B2
(45) Date of Patent: May 30, 2017

(54) TECHNIQUES FOR INCREASING ENERGY EFFICIENCY OF SENSOR CONTROLLERS THAT RECEIVE DATA FROM ONE OR MORE SENSORS

(71) Applicant: Intel Corporation, Santa Clara, CA (US)

(72) Inventors: Uttam K. Sengupta, Portland, OR (US); Rajasekaran Andiappan, Tampere (FI); Prashanth Kalluraya, Foster City, CA (US); Bruce L. Fleming, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 14/366,177

(22) PCT Filed: Dec. 28, 2013

(86) PCT No.: PCT/US2013/078154
§ 371 (c)(1),
(2) Date: Jun. 17, 2014

(87) PCT Pub. No.: WO2015/099802
PCT Pub. Date: Jul. 2, 2015

(65) Prior Publication Data
US 2015/0346799 A1 Dec. 3, 2015

(51) Int. Cl.
*G06F 1/00* (2006.01)
*G06F 1/32* (2006.01)
*G06F 9/50* (2006.01)

(52) U.S. Cl.
CPC .............. *G06F 1/3206* (2013.01); *G06F 1/32* (2013.01); *G06F 1/3243* (2013.01); *G06F 9/5094* (2013.01); *Y02B 60/142* (2013.01)

(58) Field of Classification Search
CPC ........ G06F 1/3293; G06F 1/32; G06F 1/3206; G06F 1/3243; G06F 9/5094
(Continued)

(56) References Cited

U.S. PATENT DOCUMENTS 6,574,740 B1 * 6/2003 Odaohhara ............... G06F 1/32
713/320
8,695,008 B2 * 4/2014 Regini ................... G06F 9/5094
713/322

(Continued)

FOREIGN PATENT DOCUMENTS

CN 102283598 A 12/2011
EP 2889719 A1 1/2015
(Continued)

OTHER PUBLICATIONS

European Patent Office, Extended European Search Report mailed Jun. 1, 2015, in European Patent Application No. 14192164.3.
(Continued)

*Primary Examiner* — Aurel Prifti
(74) *Attorney, Agent, or Firm* — Alpine Technology Law Group LLC

(57) ABSTRACT

Methods and apparatus relating to increasing energy efficiency of sensor controllers are described. In an embodiment, logic (e.g., within a sensor controller) performs one or more tasks corresponding to acquisition of data from one or more sensors. The logic performs the one or more tasks to allow a processor core of the sensor controller to enter (or stay in) a low power consumption state during performance of the one or more data acquisition tasks. Other embodiments are also disclosed and claimed.

27 Claims, 6 Drawing Sheets

(58) Field of Classification Search
USPC .............. 381/56; 713/323, 320, 322, 300; 709/202; 455/574; 340/539.3; 700/282, 700/56
See application file for complete search history.

(56) References Cited

U.S. PATENT DOCUMENTS

| | | | |
|---|---|---|---|
| 9,541,393 B2* | 1/2017 | Brunner | G01C 17/38 |
| 2005/0268004 A1* | 12/2005 | Kelley | G06F 9/4443 |
| | | | 710/56 |
| 2007/0191990 A1* | 8/2007 | Duan | G01F 1/667 |
| | | | 700/282 |
| 2008/0098243 A1 | 4/2008 | Saewong et al. | |
| 2008/0234935 A1 | 9/2008 | Wolf et al. | |
| 2009/0024799 A1 | 1/2009 | Jahagirdar et al. | |
| 2010/0141399 A1 | 6/2010 | Swope | |
| 2010/0302028 A1* | 12/2010 | Desai | H04W 52/0258 |
| | | | 340/539.3 |
| 2012/0100895 A1* | 4/2012 | Priyantha | H04W 52/0293 |
| | | | 455/574 |
| 2012/0204048 A1 | 8/2012 | Kim et al. | |
| 2012/0311360 A1 | 12/2012 | Balasubramanian et al. | |
| 2013/0073884 A1 | 3/2013 | Ulmer et al. | |
| 2013/0080803 A1 | 3/2013 | Ananthakrishnan et al. | |
| 2014/0089375 A1* | 3/2014 | Poornachandran | G06F 1/3293 |
| | | | 709/202 |
| 2014/0237277 A1* | 8/2014 | Mallinson | G06F 1/3206 |
| | | | 713/323 |
| 2015/0095666 A1* | 4/2015 | Ananthakrishnan | G06F 1/3212 |
| | | | 713/300 |
| 2015/0177820 A1 | 6/2015 | Kupermann et al. | |
| 2015/0245154 A1* | 8/2015 | Dadu | G06F 3/167 |
| | | | 381/56 |

FOREIGN PATENT DOCUMENTS

| | | |
|---|---|---|
| JP | 2013-251830 A | 12/2013 |
| KR | 10-2010-0061894 A | 6/2010 |
| KR | 10-2013-0071209 A | 6/2013 |
| KR | 10-2013-0124139 A | 11/2013 |
| WO | 2015/099802 A | 7/2015 |

OTHER PUBLICATIONS

International Search Report and Written Opinion received for PCT Patent Application No. PCT/US2013/078154, mailed on Sep. 26, 2014, 11 pages.

Office Action and Search Report received for Taiwanese Patent Application No. 103141439, mailed on Dec. 30, 2015, 14 pages including 6 pages of English translation.

Notice of Allowance received for Taiwanese Patent Application No. 103141439, mailed on Apr. 27, 2016, 3 pages including 1 page of English translation.

International Preliminary Report on Patentability received for International Application No. PCT/US2013/078154, mailed on Jul. 7, 2016, 8 pages.

* cited by examiner

TECHNIQUES FOR INCREASING ENERGY EFFICIENCY OF SENSOR CONTROLLERS THAT RECEIVE DATA FROM ONE OR MORE SENSORS

FIELD

The present disclosure generally relates to the field of electronics. More particularly, an embodiment relates to techniques for increasing energy efficiency of sensor controllers.

BACKGROUND

Portable computing devices are gaining popularity, in part, because of their decreasing prices and increasing performance. Another reason for their increasing popularity may be due to the fact that some portable computing devices may be operated at many locations, e.g., by relying on battery power. However, as more functionality is integrated into portable computing devices, the need to reduce power consumption becomes increasingly important, for example, to maintain battery power for an extended period of time.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
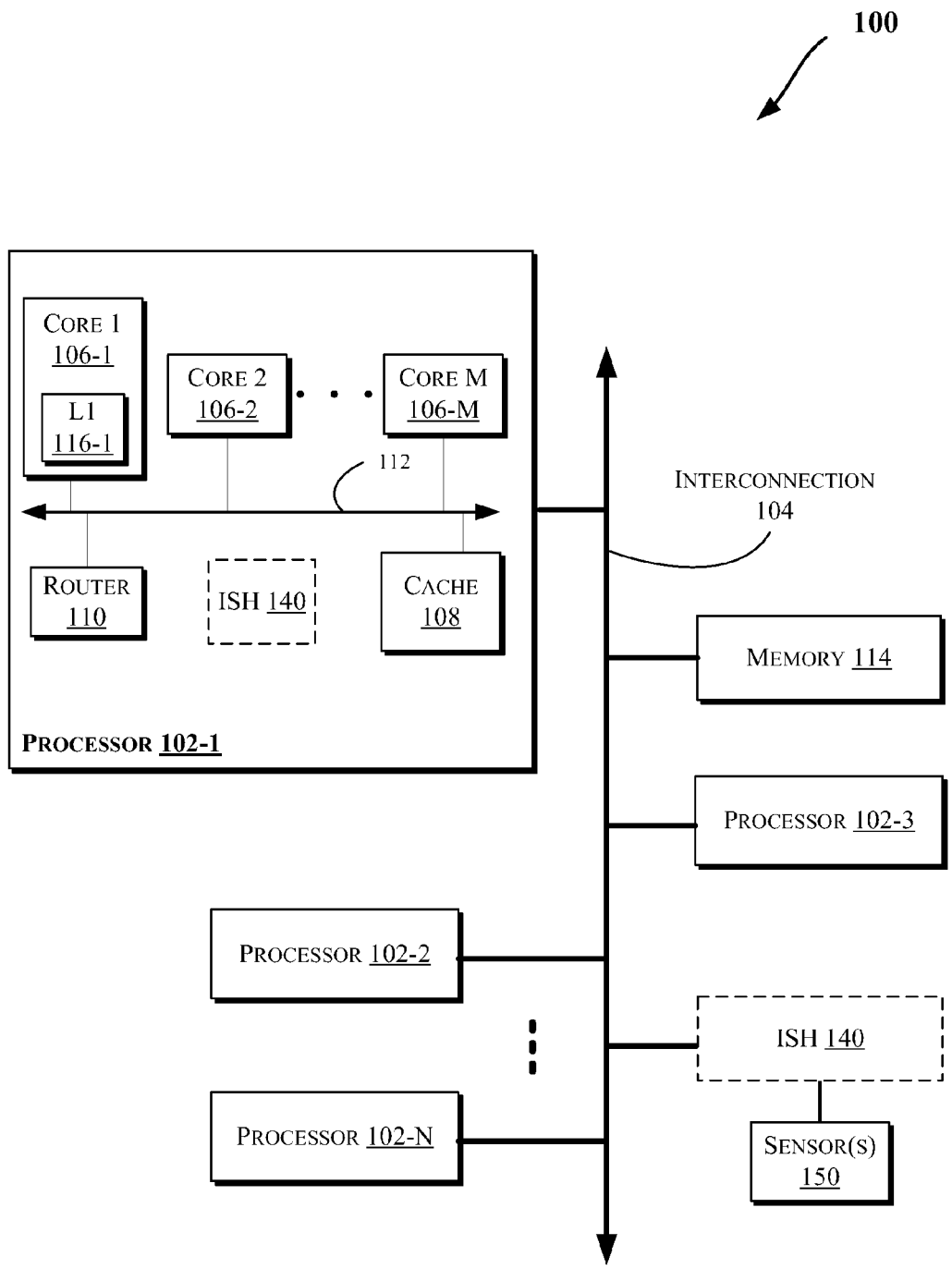
FIGS. 1 and 4-5 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some smartphones and tablets rely on sensor data to enhance the user experience for a range of applications. In order to reduce power consumption, a lower-power sensor hub (potentially discrete) may be used for sensor data processing since this allows the higher power main host to be powered down or be in a lower power state. The discrete sensor hub may use a processor core that operates at a relatively lower frequency (e.g., 100 MHz) compared to the host processor that can run at frequencies upward of 1 GHz.

The processor choice for the sensor hub has to strike a balance between its performance capabilities and its power consumption. In other words, it should have adequate performance to meet current and future workloads while reducing impact on overall battery life. Such a discrete sensor hub may perform several tasks. For example, it may read sensor data at a duty cycle, transfer the sensor data to memory, and when enough data samples have been gathered process the data and report the findings to the host processor (and wake it up if needed). However, some analysis of sensor processing workloads have shown that the majority of time is spent in data acquisition (e.g., 98%) versus actual data processing (e.g., 2%). This data may indicate that choice of 100 MHz may be too high for the sensor hub processor and instead a lower frequency would have been better from a power perspective (say even 25-50 MHz), however, that may be detrimental to handling future, more complex sensor processing workloads. For example, at upwards of 100 Mhz frequency the processor core is not ideal for data acquisition (e.g., a relatively simple task) from an energy efficiency perspective. In other words, using the processor core and its existing firmware architecture may only be fit for a very small fraction of the sensor data processing workload (e.g., around 2%) and for the rest of the workload, it is unnecessary. So, overall such solutions are not ideal from an energy efficiency perspective.

To this end, some embodiments provide techniques for increasing energy efficiency of Integrated Sensor Hubs (ISHs). Although some embodiments are described in the context of an ISH, any suitable sensor controller may be used. In an embodiment, logic (such as logic 212 of FIG. 2) will make an ISH (e.g., ISH logic 140 of FIG. 2) more energy efficient (e.g., during data acquisition tasks), while retaining properties of being OEM (Original Equipment Manufacturer) extensible and/or having sufficient headroom for future algorithms or workloads. One embodiment offloads sensor data acquisition tasks of an ISH and provides coarse motion detection through a more energy efficient smart data acquisition logic (e.g., logic 212 of FIG. 2), e.g., while modular sensor processing logic/firmware is used for the ISH. Such embodiments are envisioned to improve the overall energy efficiency of an ISH for (e.g., continuous) sensing usages.

Some embodiments may be applied in computing systems that include one or more processors (e.g., with one or more processor cores), such as those discussed with reference to FIGS. 1-6, including for example mobile computing devices such as a smartphone, tablet, UMPC (Ultra-Mobile Personal Computer), laptop computer, Ultrabook™ computing device, smart watch, smart glasses, wearable devices, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may be general-purpose CPUs (Central Processing Units) and/or GPUs (Graphics Processing Units) in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 2-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

As shown, system 100 may also include logic ISH logic 140 and one or more sensors 150. Sensor(s) 150 provide sensor data (such as accelerometer, gyro, magnetometer, pressure, ambient light, temperature, etc.) to enhance the user experience (e.g., when using computing devices including for example mobile computing devices such as a smartphone, tablet, UMPC (Ultra-Mobile Personal Computer), laptop computer, Ultrabook™ computing device, smart watch, smart glasses, wearable devices, etc.) for a whole range of applications (such as phone settings, games, etc.). Sensor(s) 150 may support new features (e.g., always-on sensing, motion-based gestures, user activity state, pedometer, etc.) to enable new categories of applications.

As previously discussed, in order to reduce power consumption, OEMs may use a low power discrete sensor hub as an offload engine for sensor data processing since this allows the higher power main host/processor to be powered down or be in a lower power state. For example, a sensor hub may be added directly into an application processor SOC (System On Chip) as an IP block. This sensor hub may use a lower power processor core (e.g., operating at a frequency such as 100 MHz). Furthermore, this IP block may be designed to be programmable by the OEMs, so an RTOS (Real-Time Operating System) and SDK (Software Development Kit) may also be provided to ease firmware development. For example, such a sensor hub may perform several tasks. It may read sensor data at a duty cycle (e.g., of about 1 to 400 Hz, or every 1 to 2.5 msec interval), transfer sensor data to memory, and when enough data samples have been gathered (e.g., 10-100 data samples— could be higher based on application), process the data and report the findings to the host processor (and wake it up if applicable).

Figure 2:
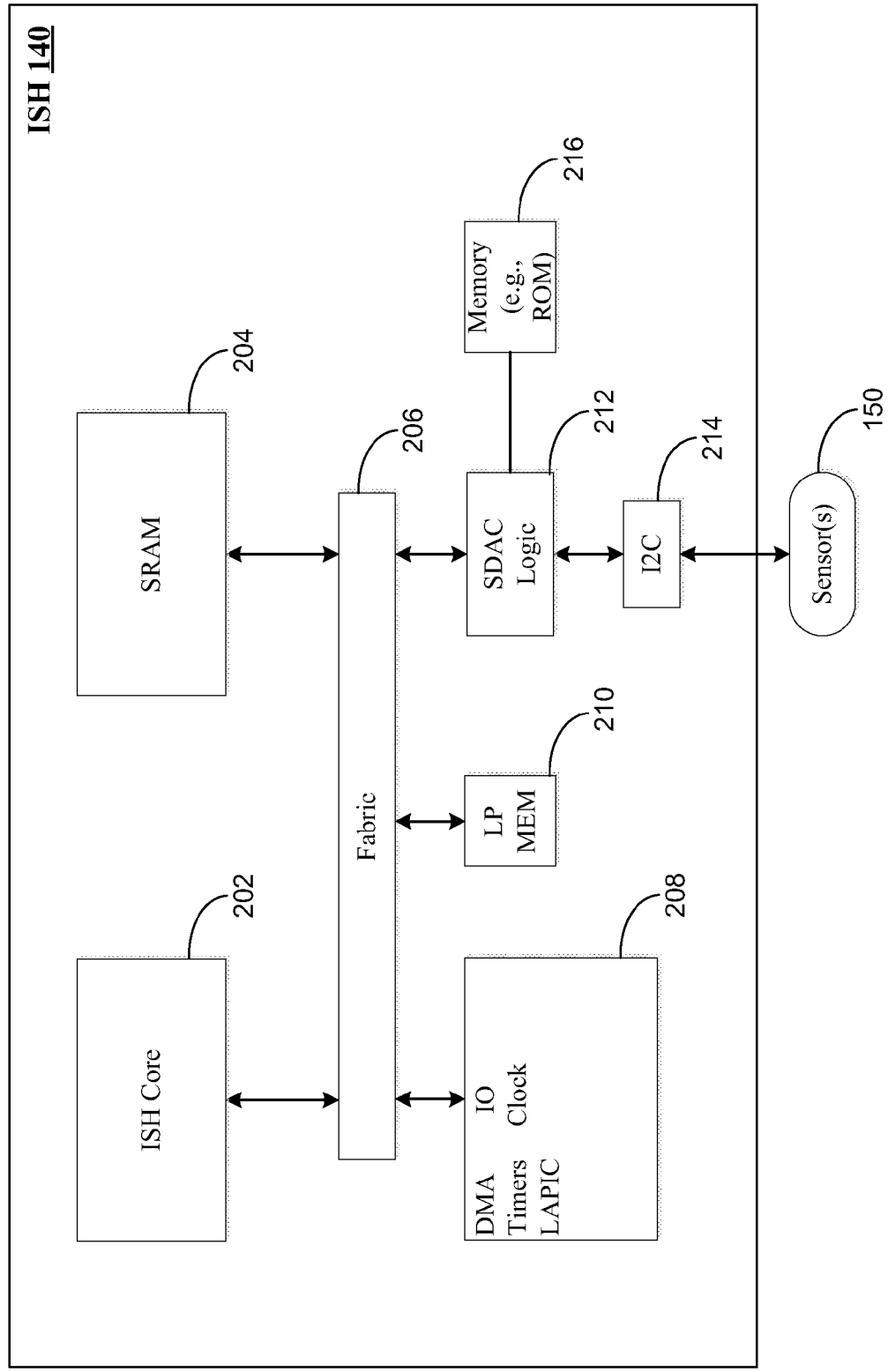
FIG. 2 illustrates a block diagram of various components of a sensor controller, according to an embodiment.

FIG. 2 illustrates a block diagram of various components of an ISH, according to an embodiment. For example, FIG. 2 illustrates various components 202-216 that may be provided in the ISH 140 of FIG. 1. As shown in FIG. 2 and further discussed herein, ISH 140 includes an ISH core 202 (e.g., which may include a lower power processor discussed herein), an SRAM (Static Random Access Memory) 204, fabric 206 (e.g., to communicatively couple various components of the ISH 140 as shown in FIG. 2), logic 208 (e.g., to receive an IO clock and perform DMA (Direct Memory Access) operations for ISH 140 (e.g., based on the IO clock), as well as provide one or more timers to support the operations of ISH 140, and an LAPIC (Local Advanced Programmable Interrupt Controller) logic to handle interrupts), memory 210, Smart Data Acquisition Controller (SDAC) logic 212, I2C logic 214, and memory 216.

As shown in FIG. 2, sensor(s) 150 are coupled over I2C port(s) 214 since the sensor(s) may be low data rate in nature. Generally, I2C refers to a multi-master serial single-ended computer bus used for attaching low-speed peripherals to a motherboard, embedded system, cell phone, or other electronic device such as mobile computing devices mentioned above. An ISH core 202 helps with the data read operations from I2C's FIFO (First In, First Out) (not shown) and writes the information to a local memory region on the hub 140 (e.g., SRAM 204 or other types of memory such as non-volatile/volatile memory, e.g., as discussed herein with reference to FIG. 4). This operation is repeated until the requisite numbers of samples have been collected and then the ISH core 202 processes the data to determine the type of motion (e.g., user walking, running, sedentary, etc.).

Furthermore, some advantages of an integrated sensor hub (such as shown in FIG. 2) that uses a lower power processor core (e.g., in ISH core 202) (not shown) include one or more of: (a) lower power processor core operates at 100 MHz and thus is capable of handling more complex workloads in a responsive fashion when compared to discrete sensor hubs which typically peak at 25-40 MHz; and/or (b) use of a paging capable architecture provides flexibility in handling larger code sizes compared to discrete sensor hubs which are limited by the size of on-board flash storage. In other words, on an ISH, new code can be swapped in from main memory at runtime unlike a discrete hub which has fixed and limited memory space and all code has to be preloaded upon system boot. Other solutions may also have the same issue in that if they provide adequate headroom for future growth, they will not be suitable for data acquisition and if they make it ideal for data acquisition, they will be limited in hosting new and more complex sensor processing algorithms.

Moreover, sensor hubs are becoming more and more complex due to newer functionalities being potentially offloaded to them (e.g., continuous location/geo-fencing). To this end, an embodiment utilizes SDAC logic 212. For example, higher performance combination of ISH core 202 and SRAM 204 are allowed to focus on efficient algorithm processing and the low compute and/or IO (Input Output) intensive tasks are offloaded to an energy efficient SDAC logic 212. In an embodiment, SDAC logic 212 includes a programmable logic that is capable of lower power consumption states than the low power processor core included in a sensor hub (such as a sensor hub's core logic).

Accordingly, whereas some current sensor hub architectures may have most of their components active during sensor data acquisition, ISH 140 of FIG. 2 may allow several of its components (such as ISH core 202, SRAM 204, and/or logic 208) to enter a low power consumption state (or otherwise remain in a low power consumption state for a longer period) to achieve better energy efficiency. For example, the SRAM contains the code and data for the sensor hub (such as I2C and/or low power processor operations) and, as a result, the SRAM has to be active while the sensor hub is performing read/write operations. The sensor data accumulated in the I2C FIFO will also be read by the low power processor core as sensor data is aggregated in the SRAM. These operations will not allow the sensor hub to provide energy efficiency when compared to the embodiment of FIG. 2, for example.

Additionally, while not all the SRAM would be used as active SRAM, the code size required to perform sensor related activity affects the amount of SRAM which can be put into its lower power state as a practical matter. Moreover, some sensor hub firmware which runs on top of a RTOS kernel does so as one monolithic block. Segmentation of firmware based on the type of processing would reduce the amount of SRAM that needs to be active during sensor DAQ (Data Acquisition) versus processing, however, that will result in increased RTOS and baseline firmware complexity, and power savings are unlikely since the common portion of the RTOS kernel is generally much larger than the specific DAQ and sensor processing routines. As such, during sensor processing, the discrete sensor hub core is fully active along with the SRAM.

By contrast, some embodiments (such as shown in FIG. 2) rely on the SDAC logic 212 to perform the sensor data acquisition tasks and/or coarse motion detection. For example, the low power processor core of ISH core 202 sends in all sensor DAQ needs to the SDAC 212 as tasks; thus, implementing a time-bound batch processing system. Once the requests are sent, the ISH core subsystem would be able to enter a low power mode/state, putting its larger SRAM into a low power state as well. Hence, the architecture of FIG. 2 allows for the SDAC 212 to perform sensor DAQ while a majority of ISH logic enters a low power state. Also, during sensing data processing, the SDAC 212 may be put into a low power state, while the ISH core 202 processes the collected sensor data from SRAM 204.

In an embodiment, SDAC 212 executes its tasks and collects the sensor data into its (e.g., dedicated and/or smaller) lower power memory (e.g., LP (Low Power) memory 210). Once the batch processing is complete the SDAC sends a wake up signal/command to ISH core 202 subsystem and transfers all the data to the SRAM 204 to allow the low power processor core of the ISH 140 to perform the tasks associated with sensor data processing (e.g., which may have been scheduled by the kernel).

Further, in order to execute various tasks, SDAC 212 may include a local memory 216 (e.g., a Read Only Memory (ROM)) to store the code required by the lower power operations of the SDAC 212. In an embodiment, SDAC 212 may include a programmable logic capable of executing a subset of x86 ISA (Instruction Set Architecture) or another type of architecture such as those discussed with reference to FIG. 4. Also, SDAC 212 may have its own instruction and/or data cache. The code stored in ROM 216 may contain all the hardware drivers required to accomplish any sensor data acquisitions tasks, such as I2C and/or GPIO (General Purpose IO) drivers. Furthermore, the lower power memory 210 used by SDAC may afford read/write access to the processing logic of SDAC and/or the low power processor of ISH core 202. In one embodiments, a bank of register file memory could be used to buffer sensor data.

Figure 3:
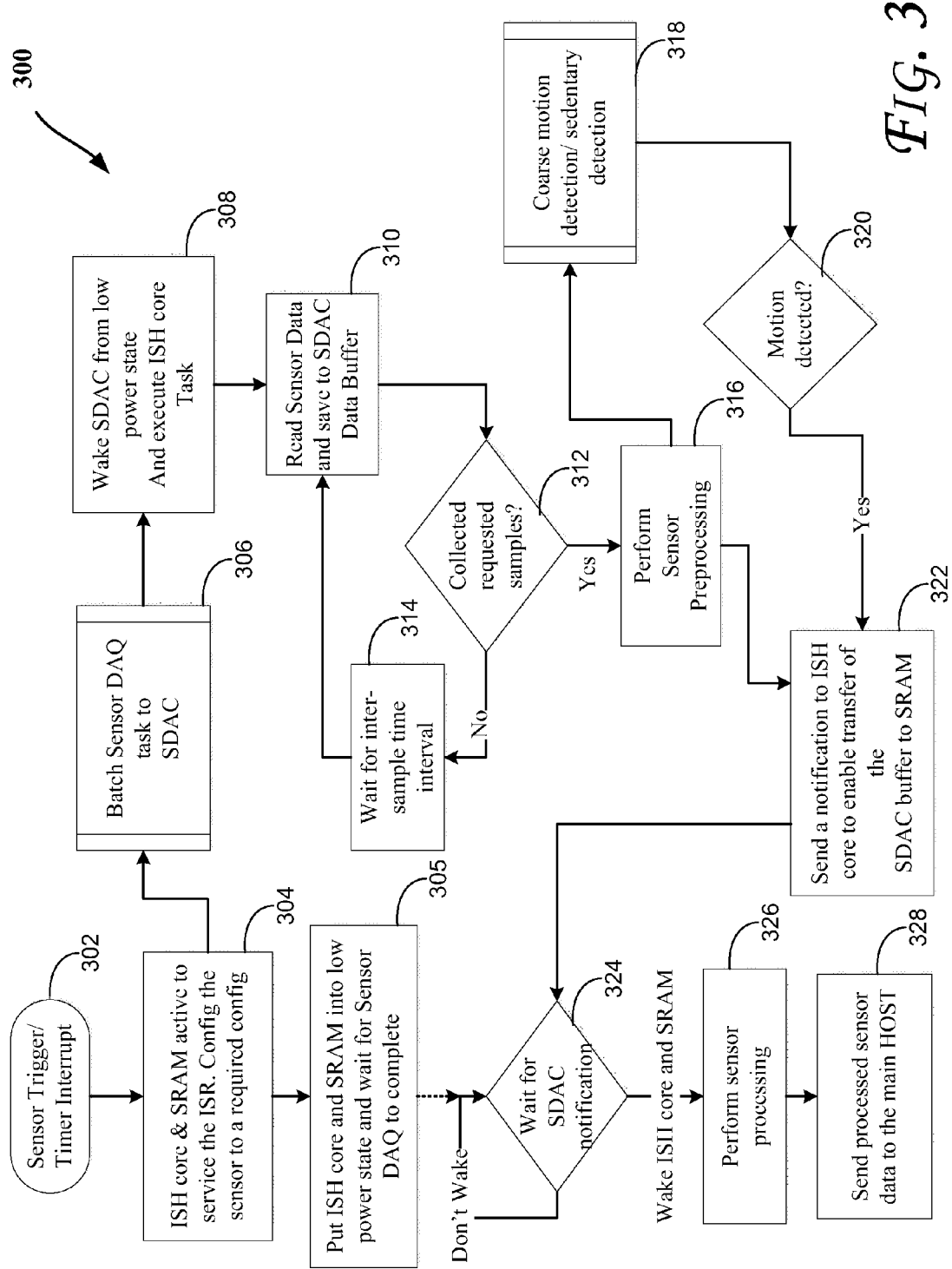
FIG. 3 illustrates a flow diagram in accordance with an embodiment.

FIG. 3 illustrates a flow diagram of a method 300 for sensor DAQ and processing using an ISH core and SDAC, according to an embodiment. One or more components discussed herein (e.g., with reference to FIGS. 1 and 3-6) may be used to perform one or more operations discussed with reference to FIG. 3. For example, one or more operations of method 300 may be performed by logic 140 (or its components discussed with reference to FIG. 2) and/or sensor(s) 150), as discussed herein.

Referring to FIGS. 1-3, at an operation 302, ISH 140 continuous sensing features are triggered at operation 302 periodically using a timer (e.g., a timer of logic 208) or as a response to a sensor interrupt (e.g., handled by LAPIC of logic 208). As a response to the trigger of operation 302, ISH core 202 wakes up and executes the ISR (Interrupt Service Routing, e.g., implemented via the LAPIC of logic 208) at operation 304, which in turn causes the scheduling of a particular sensing algorithm to execute (e.g., via its low power processor core). After operation 304, operation 305 causes ISH core and SRAM to enter a low power consumption state and wait for sensor DAQ to complete. Hence, operation 305 may be optionally followed up by operation 324 discussed below.

As mentioned before, most of the ISH duty cycles are spent on sensor DAQ. At operation 304, one or multiple sensing threads would configure the sensors at select sampling rate, resolution, and polling method. Once the sensor is set up, the sensing threads would send their sensor DAQ requests to SDAC 212 at operation 306. These (e.g., batch) requests could contain the sensor ID (Identifier), registers to read, number samples to acquire, etc. Moreover, SDAC based sensor DAQ may become more efficient with larger sets of sensor samples. At operation 308, once the SDAC is programmed (and awake if applicable) to perform its task, ISH core and its SRAM can go to its low power state and wait for a wake from SDAC logic. Besides setting sensor sampling rates, the ISH could also program the SDAC to handle coarse motion detection and if motion is detected (e.g., and only then) wake up ISH (also referred to herein as "smart wakeup"). Another function that could be offloaded from ISH to SDAC is the pedometer functionality. ISH could program the SDAC to handle step counting and storing the data in SDAC buffers (e.g., at block 210 in FIG. 2) until a specific count is reached or a host side application requests the data, or other event(s) occur that wake up the host thus allowing data transfer from SDAC to ISH processor to host.

As shown in FIG. 3, the SDAC receives the tasks and acquires the sensor data to a buffer in a smaller, lower power memory (e.g., LP memory 210) at operation 310. This process is repeated until the number of requested samples is acquired per operation 312 (e.g., while waiting for an inter-sample time interval to expire at operation 314). Once the DAQ is completed per operation 312, the SDAC can perform sensor pre-processing to remove anomalies in the sensor data (e.g., at operation 316) and perform coarse motion detection at operation 318. Coarse motion detection or sedentary detection can be critical to reduce unnecessary wake events and related running of complex signal processing algorithms on ISH logic. In other words, with SDAC performing this pre-processing (rather than relying on ISH core 202 and its low power processor core), ISH core (and its low power processor core with higher power consumption/performance) can register for only valid events (and stay in their low power consumption state to improve energy efficiency), a.k.a. actual detection of motion at operation 320 and not for every sensor interrupt.

In any given mode, once one of the exit criteria for SDAC process (such as those discussed above) is met, SDAC sends a wake signal to the ISH core 202 at operation 322. At operation 324, method 300 (e.g., ISH core 202) waits for SDAC notification. If notification is not received, ISH core is not woken. Once SDAC notification is received at operation 324, ISH core can become active and restore the SRAM to active state, read the sensor data buffer from SDAC memory, perform the heavy sensor processing thread at operation 326, and report to its programmed data sink (e.g., running on the host system, such as an Atom™ processor based or other processor suitable to operate as a host processor) at operation 328.

Hence, some embodiments will make SOCs (such as those discussed with reference to FIG. 6) and computing systems (such as those discussed with reference to FIGS. 1, 4, and/or 5) more energy efficient in handling sensor processing workloads and will further drive down power consumption for continuous sensing use cases.

Figure 4:
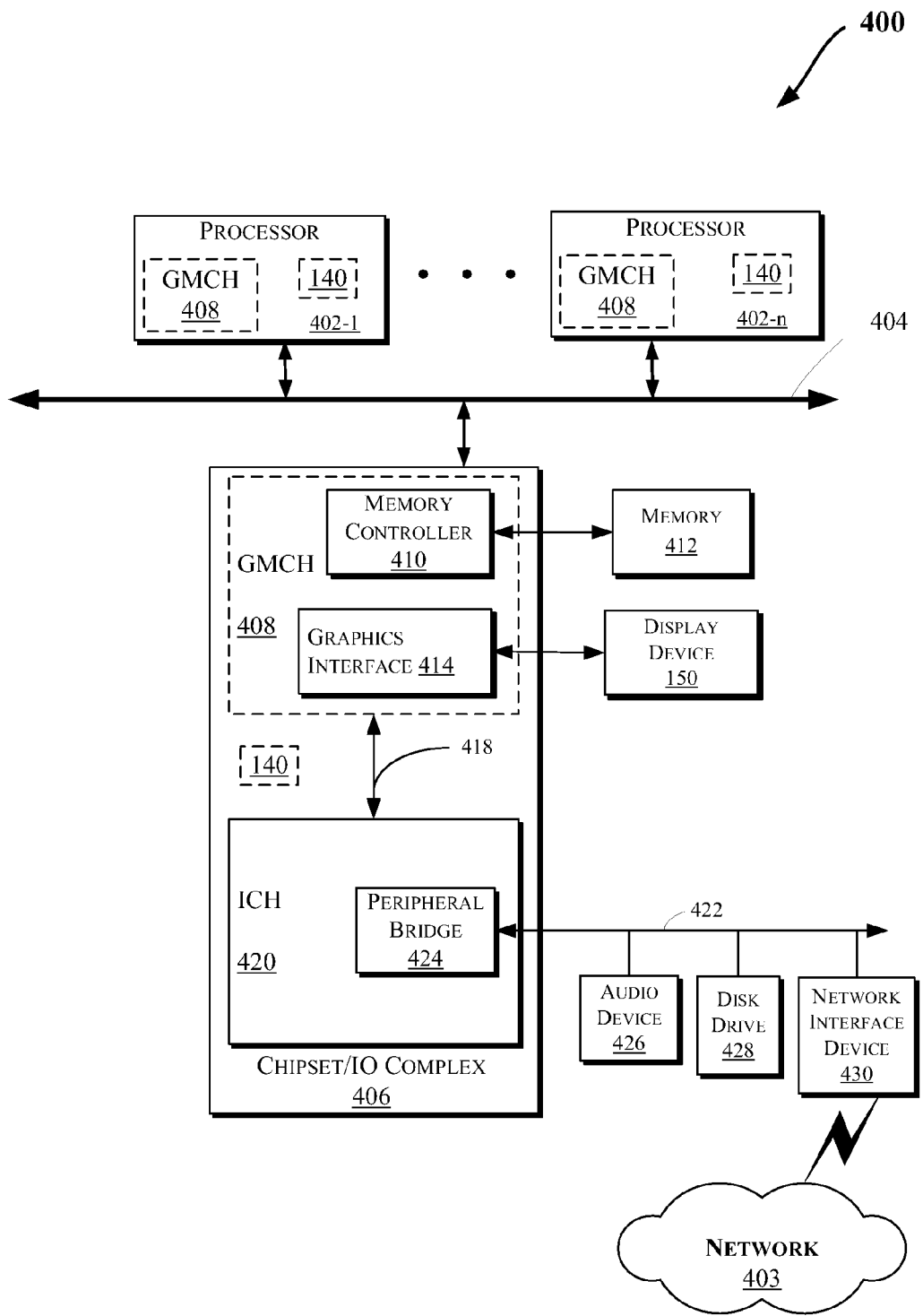

FIG. 4 illustrates a block diagram of a computing system 400 in accordance with an embodiment. The computing system 400 may include one or more Central Processing Units (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)).

Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. Further, one or more components of system 400 may include logic 140 coupled to sensor(s) 150 (not shown in FIG. 4) discussed with reference to FIGS. 1-3 (including but not limited to those locations illustrated in FIG. 4). Also, the operations discussed with reference to FIGS. 1-3 may be performed by one or more components of the system 400.

A chipset 406 may also communicate with the interconnection network 404. The chipset 406 may include a graphics memory control hub (GMCH) 408, which may be located in various components of system 400 (such as those shown in FIG. 4). The GMCH 408 may include a memory controller 410 that communicates with a memory 412 (which may be the same or similar to the memory 114 of FIG. 1). The memory 412 may store data, including sequences of instructions, that may be executed by the CPU 402, or any other device included in the computing system 400. In one embodiment, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with the display device. In one embodiment, the graphics interface 414 may communicate with a display device via an accelerated graphics port (AGP) or Peripheral Component Interconnect (PCI) (or PCI express (PCIe) interface). In an embodiment, the display (such as a flat panel display) may communicate with the graphics interface 414 through, for example, a signal converter that translates a digital representation of an image stored in a storage device such as video memory or system memory into display signals that are interpreted and displayed by the display device. The display signals produced by the display device may pass through various control devices before being interpreted by and subsequently displayed on the display device.

A hub interface 418 may allow the GMCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the GMCH 408 in some embodiments. In addition, the processor 402 and the GMCH 408 may be combined to form a single chip. Furthermore, a graphics accelerator may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
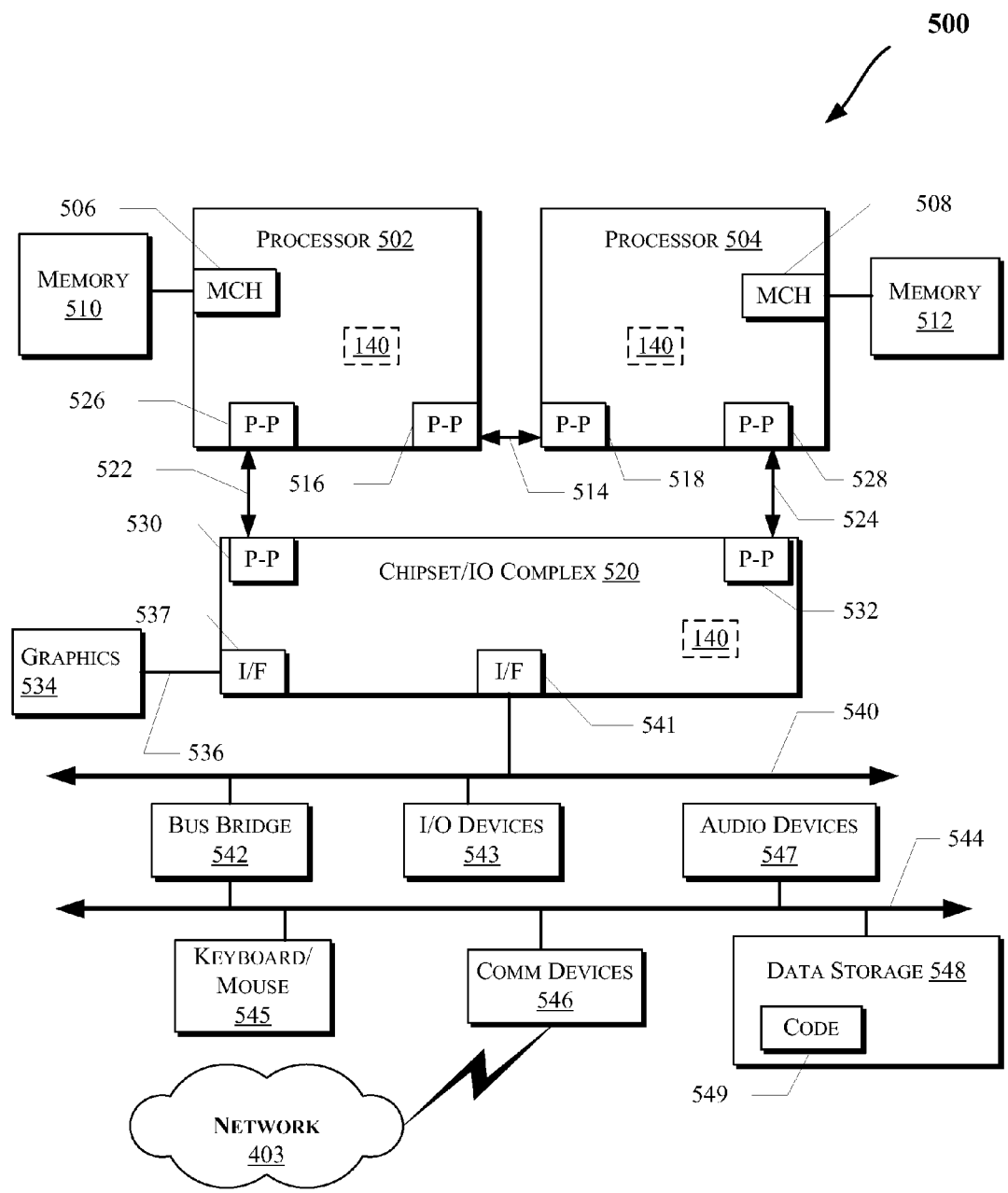

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment may be provided within the processors 502 and 504. Further, one or more components of system 500 may include logic 140 coupled to sensor(s) 150 (not shown in FIG. 5) discussed with reference to FIGS. 1-4 (including but not limited to those locations illustrated in FIG. 5). Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

Figure 6:
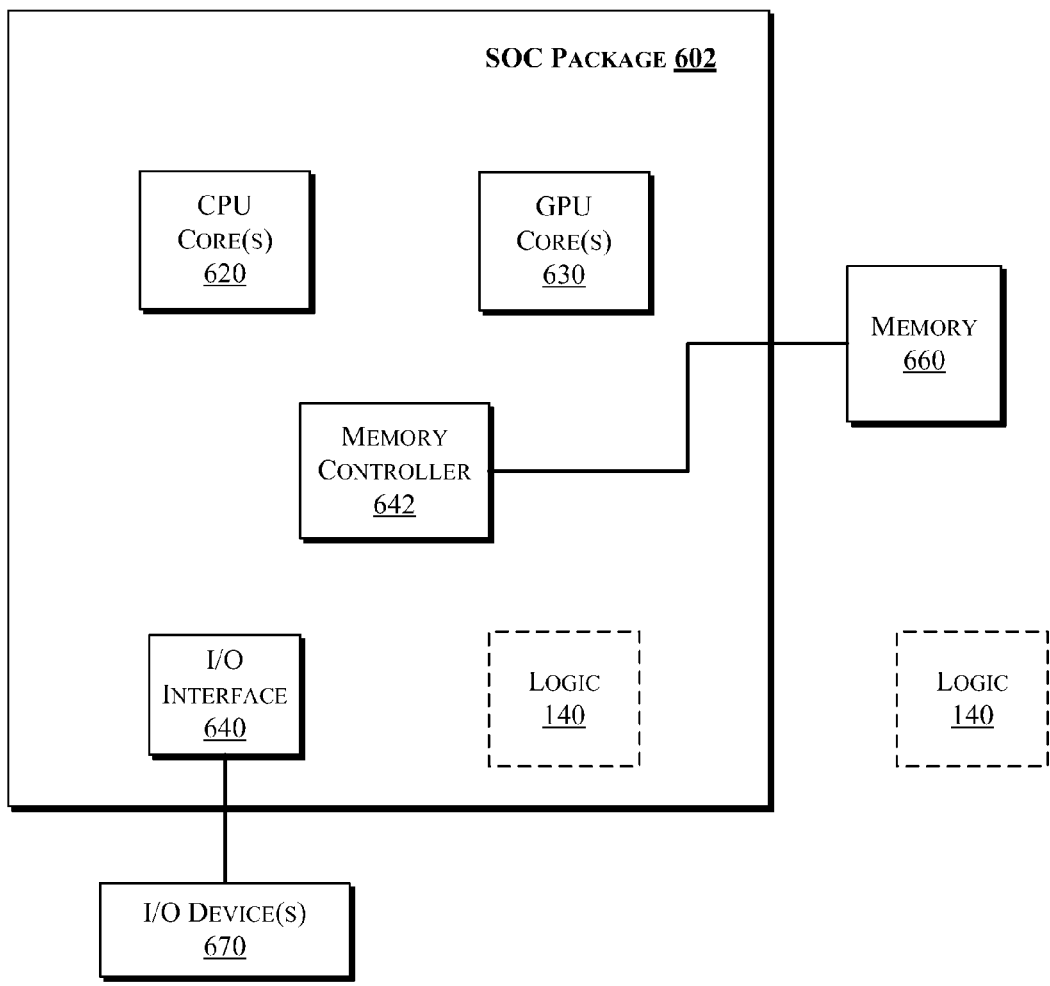
FIG. 6 illustrates a block diagram of an SOC (System On Chip) package in accordance with an embodiment.

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processing Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display device, an image/video capture device (such as a camera or camcorder/video recorder), a touch screen, a speaker, or the like. Furthermore, SOC package 602 may include/integrate logic 140 in an embodiment. Alternatively, logic 140 may be provided outside of the SOC package 602 (i.e., as a discrete logic).

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 4 and/or 5, including for example a flat panel display device, etc.).

The following examples pertain to further embodiments. Example 1 includes an apparatus comprising: logic, the logic at least partially comprising hardware logic, to perform one or more tasks corresponding to acquisition of data by a sensor controller from one or more sensors, wherein the logic is to perform the one or more tasks to allow a processor core of the sensor controller to enter or stay in a low power consumption state during performance of the one or more tasks. Example 2 includes the apparatus of example 1, wherein the logic is to perform the one or more tasks to provide motion detection, based on data received from the one or more sensors, prior to causing the processor core to exit the low power consumption state. Example 3 includes the apparatus of example 1, wherein the logic is to perform the one or more tasks to allow a memory device of the sensor controller to enter or stay in a low power consumption state during the one or more data acquisition tasks. Example 4 includes the apparatus of example 3, wherein the memory device is to comprise a static random access memory device. Example 5 includes the apparatus of example 1, wherein the logic is to cause the processor core to exit the low power consumption state in response to completion of the one or more tasks. Example 6 includes the apparatus of example 1, wherein the logic is to cause transfer of data from a first memory device to a second memory device in response to completion of the one or more tasks. Example 7 includes the apparatus of example 6, wherein the first memory device is to comprise a local memory coupled to the logic. Example 8 includes the apparatus of example 6, wherein the first memory device is to comprise a local memory coupled to the logic via a fabric. Example 9 includes the apparatus of example 6, wherein the second memory device is to comprise a static random access memory device. Example 10 includes the apparatus of example 6, wherein the second memory device is to comprise a static random access memory device coupled to store data accessible by the processor core. Example 11 includes the apparatus of example 1, wherein the logic is to perform the one or more tasks to detect a number of steps, based on data received from the one or more sensors, prior to causing the processor core to exit the low power consumption state. Example 12 includes the apparatus of example 1, wherein a processor, having one or more processor cores, is to comprise the logic. Example 13 includes the apparatus of example 1, wherein one or more of the logic, the processor core, and memory are on a single integrated circuit die.

Example 14 includes a computer-readable medium comprising one or more instructions that when executed on a processor configure the processor to perform one or more operations to: perform one or more tasks corresponding to acquisition of data by a sensor controller from one or more sensors, wherein the one or more tasks are performed to allow a processor core of the sensor controller to enter or stay in a low power consumption state during performance of the one or more tasks. Example 15 includes the computer-readable medium of example 14, further comprising one or more instructions that when executed on the processor configure the processor to perform one or more operations to provide motion detection, based on data received from the one or more sensors, prior to causing the processor core to exit the low power consumption state. Example 16 includes the computer-readable medium of example 14, further comprising one or more instructions that when executed on the processor configure the processor to perform one or more operations to perform the one or more tasks to allow a memory device of the sensor controller to enter or stay in a low power consumption state during the one or more data acquisition tasks. Example 17 includes the computer-readable medium of example 14, further comprising one or more instructions that when executed on the processor configure the processor to perform one or more operations to cause the processor core to exit the low power consumption state in response to completion of the one or more tasks. Example 18 includes the computer-readable medium of example 14, further comprising one or more instructions that when executed on the processor configure the processor to perform one or more operations to cause transfer of data from a first memory device to a second memory device in response to completion of the one or more tasks. Example 19 includes the computer-readable medium of example 18, wherein the first memory device comprises a local memory coupled to the logic via a fabric and wherein the second memory device comprises a static random access memory device coupled to store data accessible by the processor core. Example 20 includes the computer-readable medium of example 14, further comprising one or more instructions that when executed on the processor configure the processor to perform one or more operations to detect a number of steps, based on data received from the one or more sensors, prior to causing the processor core to exit the low power consumption state.

Example 21 includes a method comprising: performing one or more tasks corresponding to acquisition of data by a sensor controller from one or more sensors, wherein the one or more tasks are performed to allow a processor core of the sensor controller to enter or stay in a low power consumption state during performance of the one or more tasks. Example 22 includes the method of example 21, further comprising performing one or more operations to provide motion detection, based on data received from the one or more sensors, prior to causing the processor core to exit the low power consumption state. Example 23 includes the method of example 21, further comprising performing the one or more tasks to allow a memory device of the sensor controller to enter or stay in a low power consumption state during the one or more data acquisition tasks. Example 24 includes the method of example 21, further comprising causing the processor core to exit the low power consumption state in response to completion of the one or more tasks. Example 25 includes the method of example 21, further comprising causing transfer of data from a first memory device to a second memory device in response to completion of the one or more tasks. Example 26 includes the method of example 25, wherein the first memory device comprises a local memory coupled to the logic via a fabric and wherein the second memory device comprises a static random access memory device coupled to store data accessible by the processor core. Example 27 includes the method of example 21, further comprising detecting a number of steps, based on data received from the one or more sensors, prior to causing the processor core to exit the low power consumption state.

Example 28 includes a system comprising: memory to store data accessible by a processor core; a sensor controller comprising the processor core; one or more sensors; and logic, the logic at least partially comprising hardware logic, to perform one or more tasks corresponding to acquisition of data by the sensor controller from the one or more sensors, wherein the logic is to perform the one or more tasks to allow the processor core to enter or stay in a low power consumption state during performance of the one or more tasks. Example 29 includes the system of example 28, wherein the logic is to perform one or more operations to provide motion detection, based on data received from the one or more sensors, prior to causing the processor core to exit the low power consumption state. Example 30 includes the system of example 28, wherein the logic is to perform the one or more tasks to allow a memory device of the sensor controller to enter or stay in a low power consumption state during the one or more data acquisition tasks. Example 31 includes the system of example 30, wherein the memory device is to comprise a static random access memory device. Example 32 includes the system of example 28, wherein the logic is to cause the processor core to exit the low power consumption state in response to completion of the one or more tasks. Example 33 includes the system of example 28, wherein the logic is to cause transfer of data from a first memory device to a second memory device in response to completion of the one or more tasks. Example 34 includes the system of example 33, wherein the first memory device is to comprise a local memory coupled to the logic. Example 35 includes the system of example 33, wherein the first memory device is to comprise a local memory coupled to the logic via a fabric. Example 36 includes the system of example 33, wherein the second memory device is to comprise a static random access memory device. Example 37 includes the system of example 33, wherein the second memory device is to comprise a static random access memory device coupled to store data accessible by the processor core. Example 38 includes the system of example 28, wherein the logic is to perform one or more operations to detect a number of steps, based on data received from the one or more sensors, prior to causing the processor core to exit the low power consumption state. Example 39 includes the system of example 28, wherein a processor, having one or more processor cores, is to comprise the logic. Example 40 includes the system of example 28, wherein one or more of the logic, the processor core, and memory are on a single integrated circuit die.

Example 41 includes a computer-readable medium comprising one or more instructions that when executed on a processor configure the processor to perform one or more operations of any of examples 21 to 27.

Example 42 includes an apparatus comprising means to perform a method as set forth in any of examples 21 to 27.

Example 43 includes an apparatus comprising means to perform a method as set forth in any preceding example.

Example 44 includes machine-readable storage including machine-readable instructions, when executed, to implement a method or realize an apparatus as set forth in any preceding example.

In various embodiments, the operations discussed herein, e.g., with reference to FIGS. 1-6, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    logic, the logic at least partially comprising hardware logic, to perform one or more tasks corresponding to acquisition of data by a sensor controller from one or more sensors,
    wherein the logic is to perform the one or more tasks, instead of a low power processor core of the sensor controller, to allow the low power processor core to enter a low power consumption state during performance of the one or more tasks, wherein the logic is capable to support one or more power consumption states that are to consume less power than the low power consumption state of the low power processor core, wherein the logic is to collect a selected number of samples from the one or more sensors prior to performance of the one or more tasks, wherein the logic is to wait for an inter-sample time interval before collection of a next sample from the selected number of samples.

2. The apparatus of claim 1, wherein the logic is to perform the one or more tasks to provide motion detection, based on data received from the one or more sensors, prior to causing the processor core to exit the low power consumption state.

3. The apparatus of claim 1, wherein the logic is to perform the one or more tasks to allow a memory device of the sensor controller to enter or stay in a low power consumption state during the one or more data acquisition tasks.

4. The apparatus of claim 3, wherein the memory device is to comprise a static random access memory device.

5. The apparatus of claim 1, wherein the logic is to cause the processor core to exit the low power consumption state in response to completion of the one or more tasks.

6. The apparatus of claim 1, wherein the logic is to cause transfer of data from a first memory device to a second memory device in response to completion of the one or more tasks.

7. The apparatus of claim 6, wherein the first memory device is to comprise a local memory coupled to the logic.

8. The apparatus of claim 6, wherein the first memory device is to comprise a local memory coupled to the logic via a fabric.

9. The apparatus of claim 6, wherein the second memory device is to comprise a static random access memory device.

10. The apparatus of claim 6, wherein the second memory device is to comprise a static random access memory device coupled to store data accessible by the processor core.

11. The apparatus of claim 1, wherein the logic is to perform the one or more tasks to detect a number of steps, based on data received from the one or more sensors, prior to causing the processor core to exit the low power consumption state.

12. The apparatus of claim 1, wherein a processor, having one or more processor cores, is to comprise the logic.

13. The apparatus of claim 1, wherein one or more of the logic, the processor core, and memory are on a single integrated circuit die.

14. The apparatus of claim 1, wherein the sensor controller is to comprise the low power processor core and the logic.

15. The apparatus of claim 1, wherein the logic is to perform the one or more tasks, instead of the low processor core of the sensor controller, to allow the low power processor core to remain in the low power consumption state for a longer period.

16. A non-transitory computer-readable medium comprising one or more instructions that when executed on a processor configure the processor to perform one or more operations to:
    perform, at logic, one or more tasks corresponding to acquisition of data by a sensor controller from one or more sensors,
    wherein the one or more tasks are performed by the logic, instead of a low power processor core of the sensor controller, to allow the low power processor core of the sensor controller, to enter a low power consumption state during performance of the one or more tasks, wherein the logic is capable to support one or more power consumption states that consume less power than the low power consumption state of the low power processor core, wherein the logic is to collect a selected number of samples from the one or more sensors prior to performance of the one or more tasks, wherein the logic wait for an inter-sample time interval before collection of a next sample from the selected number of samples.

17. The non-transitory computer-readable medium of claim 16, further comprising one or more instructions that when executed on the processor configure the processor to perform one or more operations to provide motion detection, based on data received from the one or more sensors, prior to causing the processor core to exit the low power consumption state.

18. The non-transitory computer-readable medium of claim 16, further comprising one or more instructions that when executed on the processor configure the processor to perform one or more operations to perform the one or more tasks to allow a memory device of the sensor controller to enter or stay in a low power consumption state during the one or more data acquisition tasks.

19. The non-transitory computer-readable medium of claim 16, further comprising one or more instructions that when executed on the processor configure the processor to perform one or more operations to cause the processor core to exit the low power consumption state in response to completion of the one or more tasks.

20. The non-transitory computer-readable medium of claim 16, further comprising one or more instructions that when executed on the processor configure the processor to perform one or more operations to cause transfer of data from a first memory device to a second memory device in response to completion of the one or more tasks.

21. The non-transitory computer-readable medium of claim 16, further comprising one or more instructions that when executed on the processor configure the processor to perform one or more operations to detect a number of steps, based on data received from the one or more sensors, prior to causing the processor core to exit the low power consumption state.

22. A method comprising:
performing, at logic, one or more tasks corresponding to acquisition of data by a sensor controller from one or more sensors,
wherein the one or more tasks are performed by the logic, instead of a low power processor core of the sensor controller, to allow the low power processor core of the sensor controller, to enter low power consumption state during performance of the one or more tasks, wherein the logic is capable to support one or more power consumption states that consume less power than the low power consumption state of the low power processor core, wherein the logic collects a selected number of samples from the one or more sensors prior to performance of the one or more tasks, wherein the logic waits for an inter-sample time interval before collection of a next sample from the selected number of samples.

23. The method of claim 22, further comprising performing one or more operations to provide motion detection, based on data received from the one or more sensors, prior to causing the processor core to exit the low power consumption state.

24. The method of claim 22, further comprising performing the one or more tasks to allow a memory device of the sensor controller to enter or stay in a low power consumption state during the one or more data acquisition tasks.

25. A system comprising:
memory to store data accessible by a low power processor core;
a sensor controller comprising the low power processor core;
one or more sensors; and
logic, the logic at least partially comprising hardware logic, to perform one or more tasks corresponding to acquisition of data by the sensor controller from the one or more sensors,
wherein the logic is to perform the one or more tasks, instead of the low power processor core of the sensor controller, to allow the low power processor core to enter a low power consumption state during performance of the one or more tasks, wherein the logic is capable to support one or more power consumption states that are to consume less power than the low power consumption state of the low power processor core, wherein the logic is to collect a selected number of samples from the one or more sensors prior to performance of the one or more tasks, wherein the logic is to wait for an inter-sample time interval before collection of a next sample from the selected number of samples.

26. The system of claim 25, wherein the logic is to perform one or more operations to provide motion detection, based on data received from the one or more sensors, prior to causing the processor core to exit the low power consumption state.

27. The system of claim 25, wherein the logic is to perform the one or more tasks to allow a memory device of the sensor controller to enter or stay in a low power consumption state during the one or more data acquisition tasks.

* * * * *

UNITED STATES PATENT AND TRADEMARK OFFICE
CERTIFICATE OF CORRECTION

PATENT NO. : 9,665,155 B2  Page 1 of 1
APPLICATION NO. : 14/366177
DATED : May 30, 2017
INVENTOR(S) : Sengupta et al.

It is certified that error appears in the above-identified patent and that said Letters Patent is hereby corrected as shown below:

In the Claims

In Column 14, in Claim 16, Line 33 delete "," after 'sensor controller'

In Column 15, in Claim 22, Line 17 insert -- a -- after 'to enter'

In Column 15, in Claim 22, Line 17 delete "," after 'sensor controller'

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*